US011825191B2

(12) United States Patent
Wang et al.

(10) Patent No.: US 11,825,191 B2
(45) Date of Patent: Nov. 21, 2023

(54) METHOD FOR ASSISTING THE ACQUISITION OF MEDIA CONTENT AT A SCENE

(71) Applicant: Orange, Issy-les-Moulineaux (FR)

(72) Inventors: Xin Wang, Beijing Dongcheng District (CN); Tao Zheng, Beijing Dongcheng District (CN); Xiaoyu Wang, Beijing Dongcheng District (CN)

(73) Assignee: Orange, Issy-les-Moulineaux (FR)

( * ) Notice: Subject to any disclaimer, the term of this patent is extended or adjusted under 35 U.S.C. 154(b) by 121 days.

(21) Appl. No.: 17/603,857

(22) PCT Filed: Apr. 17, 2020

(86) PCT No.: PCT/IB2020/000364
§ 371 (c)(1),
(2) Date: Oct. 14, 2021

(87) PCT Pub. No.: WO2020/212761
PCT Pub. Date: Oct. 22, 2020

(65) Prior Publication Data
US 2022/0321774 A1   Oct. 6, 2022

(30) Foreign Application Priority Data
Apr. 19, 2019  (WO) ................ PCT/CN2019/083436

(51) Int. Cl.
*H04N 5/335* (2011.01)
*H04N 23/60* (2023.01)
(Continued)

(52) U.S. Cl.
CPC ............. *H04N 23/64* (2023.01); *H04N 5/265* (2013.01); *H04N 23/632* (2023.01); *H04N 23/69* (2023.01)

(58) Field of Classification Search
CPC .................................................... H04N 23/632
See application file for complete search history.

(56) References Cited

U.S. PATENT DOCUMENTS 10,013,763 B1   7/2018  Brailovskiy et al.
10,130,885 B1   11/2018 Energin
2017/0256040 A1*  9/2017  Grauer ................ H04N 23/631

FOREIGN PATENT DOCUMENTS

WO   WO 03/041411 A1   5/2003
WO   WO 2014/041353 A2   3/2014
(Continued)

OTHER PUBLICATIONS

International Search Report for International Application No. PCT/IB2020/000364 dated Jul. 3, 2020.
(Continued)

*Primary Examiner* — Gary C Vieaux
(74) *Attorney, Agent, or Firm* — Knobbe, Martens, Olson & Bear, LLP

(57) ABSTRACT

A method for assisting the acquisition of a media content at a scene provided with at least one main acquisition unit connected to a server is disclosed. The method includes performing by a processing unit of the server: receiving, from an electronic device including a secondary acquisition unit, a request for acquiring a media content at the scene, the request including data representative of acquisition conditions at the secondary acquisition unit; and providing in response a first media content generated as a function of data representative of acquisition conditions at the secondary acquisition unit from generic media content outputted by the at least one main acquisition unit.

13 Claims, 2 Drawing Sheets

(51) Int. Cl.
    *H04N 5/265*     (2006.01)
    *H04N 23/69*     (2023.01)
    *H04N 23/63*     (2023.01)

(56) References Cited

FOREIGN PATENT DOCUMENTS

| | | |
|---|---|---|
| WO | WO 2014/114151 A1 | 7/2014 |
| WO | WO 2019/007246 A1 | 1/2019 |
| WO | WO 2019/046905 A1 | 3/2019 |

OTHER PUBLICATIONS

International Search Report and the Written Opinion of the International Searching Authority for International Application No. PCT/CN2019/083436, dated Jan. 14, 2020.

* cited by examiner

METHOD FOR ASSISTING THE ACQUISITION OF MEDIA CONTENT AT A SCENE

CROSS-REFERENCE TO RELATED APPLICATIONS

This application is filed under 35 U.S.C. § 371 as the U.S. National Phase of Application No. PCT/IB2020/000364 entitled "METHOD FOR ASSISTING THE ACQUISITION OF MEDIA CONTENT AT A SCENE" and filed Apr. 17, 2020, and which claims priority to PCT/CN2019/083436 filed Apr. 19, 2019, each of which is incorporated by reference in its entirety.

BACKGROUND

Field

The field of this development is that of media contents such as audiovisual contents. More particularly, the development relates to a method for assisting the acquisition of media content at a scene.

Description of the Related Technology

It is very common for users who are present at a live event (such as a concert, a conference or a sports meeting) to take pictures or videos with their smartphones and possibly share them with family and friends.

However, such pictures/videos generally suffer from very low quality because of the need for long distance recording: the location of interest (stage, field, etc.) is often far away from the spectator's seats. Indeed, built-in cameras of smartphones do not have a very large number of pixels, and cannot use optical zoom (i.e. mechanical adjustment of the camera's optics) but only digital zoom which is accomplished electronically by cropping an image down to a centered area with the same aspect ratio as the original (with a loss of information).

Furthermore, even if high quality pictures/videos could be acquired at live event with smartphones having more sophisticated cameras, transfer issues arise then on the network because of the high number of people trying to send their high quality pictures/videos over the air from the same location, leading to massive overload and possibly network failure.

There is consequently a need for easily and efficiently acquiring content with an enhanced quality during an event. There is also a need for efficiently sharing contents acquired with an enhanced quality during an event.

SUMMARY OF CERTAIN INVENTIVE ASPECTS

For these purposes, the present development provides a method for assisting the acquisition of a media content at a scene provided with at least one main acquisition unit connected to a server, including:

receiving (a), from an electronic device comprising a secondary acquisition unit, a request for acquiring a media content at the scene, said request comprising data representative of acquisition conditions at the secondary acquisition unit;

providing (b) in response a first media content generated from generic media content acquired by said at least one main acquisition unit, as a function of data representative of acquisition conditions at the secondary acquisition unit.

Preferred but non-limiting features of the present development are as follow:

the method further comprises acquiring (a0) a second media content using said secondary acquisition unit;

the method further comprises a step (c) of combining the first and second media contents, so as to generate a composite media content;

request for acquiring a media content at the scene is sent from the electronic device when detecting (a1) a given trigger event during the acquisition of said second media content;

the electronic device also comprises an interface, said trigger event being an action by the user on said interface representative of an intent of improving quality of acquisition;

said media content is a visual content, the second media content being displayed on the interface during acquisition, wherein the trigger event is a zooming in action on said interface;

there is a set of main acquisition units, step (b) comprises identifying a subset of said set of main acquisition units as a function of data representative of acquisition conditions at the secondary acquisition unit, said first media content being generated from the generic media contents outputted by each of the main acquisition units of said subset;

step (b) comprises constructing a tridimensional model from the generic media contents outputted by the main acquisition units, and generating said first media content from the tridimensional model;

said data representative of acquisition conditions at the secondary acquisition unit comprises the value of at least one parameter chosen among environment parameters and/or positioning parameters;

the method further comprises a step of transmitting (d) to the first electronic device the first media content, or the composite media content from the server;

the method further comprising a step of transmitting (e) to at least one second electronic device the first media content, or the composite media content from the server.

In a second aspect, the development provides a server connected to at least one main acquisition unit of a scene, the server comprising a processing unit configured to implement:

receiving, from an electronic device comprising a secondary acquisition unit, a request for acquiring a media content at the scene, said request comprising data representative of acquisition conditions at the secondary acquisition unit;

providing in response a first media content generated from generic media content outputted by said at least one main acquisition unit, as a function of data representative of acquisition conditions at the secondary acquisition unit.

According to a third and a fourth aspects, the development provides a computer program product, comprising code instructions for executing a method according to the first aspect for assisting the acquisition of a media content at a scene; and a computer-readable medium, on which is stored a computer program product comprising code instructions for executing a method according to the first aspect for assisting the acquisition of a media content at a scene.

BRIEF DESCRIPTION OF THE DRAWINGS

The above and other objects, features and advantages of this development will be apparent in the following detailed description of an illustrative embodiment thereof, which is to be read in connection with the accompanying drawings wherein.

DETAILED DESCRIPTION OF CERTAIN ILLUSTRATIVE EMBODIMENTS

Architecture

Figure 1:
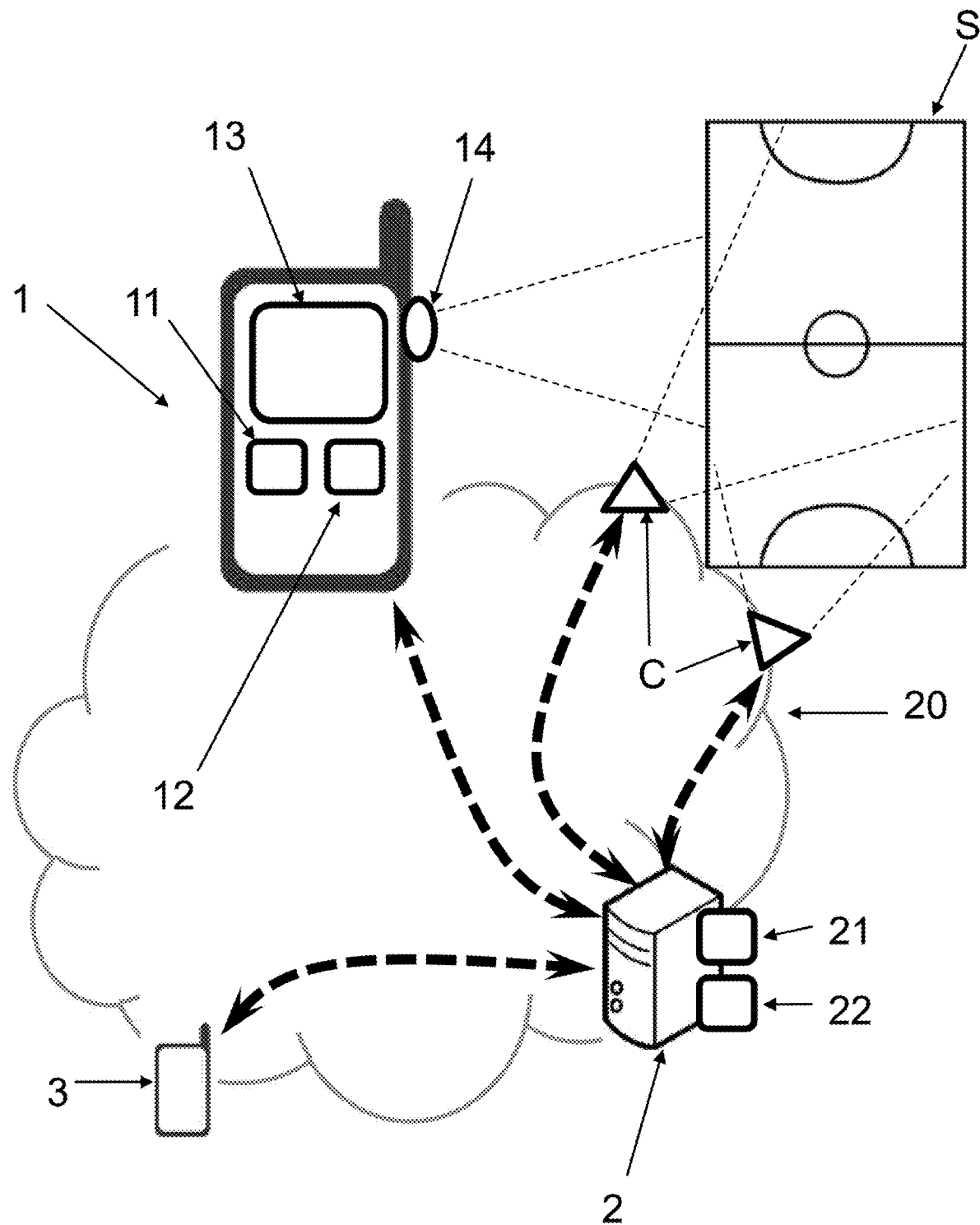
FIG. 1 illustrates an example of architecture in which the method according to the development is performed.

The present development relates to a method for assisting the acquisition (by an electronic device 1) of media content at a scene S, as represented by FIG. 1. This scene S, which is typically a stadium, a sport field, a concert hall, a conference hall, or any other event location, is provided with at least one main acquisition unit C connected to a server 2.

The electronic device 1 is typically a smartphone, a tablet, a digital camera or any other personal terminal of a user, comprising a built-in acquisition unit 14 (typically a camera and/or a microphone, see below), here called "secondary acquisition unit" to distinguish it from the main acquisition unit(s) C.

A media content acquired by the secondary acquisition unit 14 of the electronic device 1 will be referred to as "second media content", and media content acquired by the main acquisition unit(s) C will be referred to as "generic media content" (as this latest media content is automatically acquired, and the user of the device 1 has no control over this acquisition).

By "assisting the acquisition", it is meant that the present method aims at helping the user to improve the quality of the media content acquired by the electronic device 1. As it will be explained, the present method proposes to use said main acquisition unit C to "supplement" and possibly "augment" the (generally low-cost and low-quality) secondary acquisition unit 14 of the electronic device 1. In particular, the present method provides a "first media content" constituting an enhanced version of the second media content which is, or may be, acquired by the secondary acquisition unit 14.

By "provided with at least one main acquisition unit C", it is meant that the main acquisition unit(s) C are located at the scene or at the immediate vicinity of said scene, so as to be able to acquire media contents depicting said scene S. Indeed, said main acquisition unit(s) C are typically peripheral cameras (in particular professional ground cameras, aimed at TV broadcast, for example surrounding the pitch in a stadium or the stage in a concert hall), microphones, or other high-quality recording devices directed towards the scene S. They might be of several different types, for instance a combination of cameras and microphones, and a "set" of the main acquisition units C is preferably defined. Said media content is preferably an audiovisual content, i.e., a picture or a video (with or without sound, i.e. a visual content), but possibly only an audio content. In the following description, the example of an audiovisual content will be used, in particular a video of the scene S (i.e. the main acquisition units C have a "view" on the scene S).

Indeed, while a user might be interested in acquiring a picture/video of the surroundings of the scene S (for instance of the audience), the present method may not be able to assist in acquiring such content because the main acquisition unit(s) C are generally only acquiring pictures/videos of the scene S itself.

The method is mostly performed at the server 2 comprising at least a processing unit 21 (typically a processor), and possibly a storage unit 22 (a memory, for instance a hard drive). The server 2 may be located at the scene S, or be a remote server connected to the main acquisition unit(s) C through a network 20 such as internet.

As explained, the device 1 is typically a mobile terminal such as a smartphone, and also comprises at least a processing unit 11 (typically a processor), an interface 13 (typically a screen, possibly touch sensitive) and possibly a storage unit 12 (a memory, for instance flash memory) and the secondary acquisition unit 14, i.e. in the case of visual contents optical means for acquiring a picture/video of any view in front of the device 1. The device 1 is preferably configured to output, on said interface 13, a preview of a view visible from the secondary acquisition unit 14. To this end, the secondary acquisition unit 14 is advantageously on a front face of the device 1, wherein the interface 13 is on a rear face of the device. It is to be noted that the device 1 may comprise another secondary acquisition unit 14 on the rear face (which is for example the case for smartphones) or have the interface 13 articulated, so as to allow taking selfies.

By "preview", it is meant here a depiction (which is not further kept) of an image that is being acquired at this moment (or that would be acquired if the user triggers the secondary acquisition unit 14). Such preview allows the users to visualize the picture/video they are acquiring (or about to acquire) so as to change their position or the settings if they are not satisfied.

The device 1 is also connected to the server 2, in particular through the network 20 (notably via a mobile network, in particular a GSM/UMTS/LTE network, see below).

Method

Figure 2:
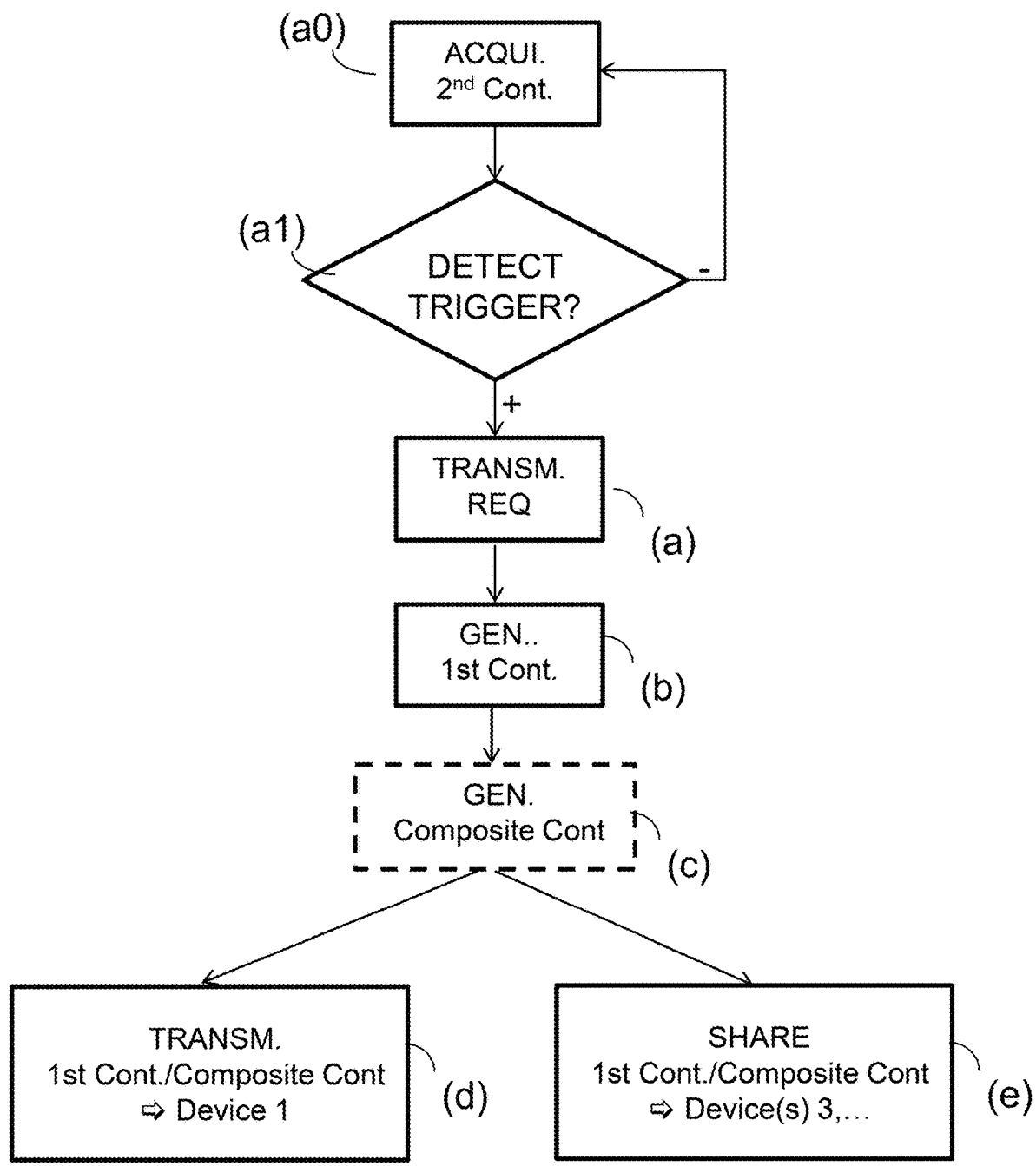
FIG. 2 is a diagram representing steps of a preferred embodiment of a method according to the development.

With reference to FIG. 2, the present method first comprises a step (a) of receiving (typically performed by the processing unit 21 of the server 2), from the electronic device 1, a request for acquiring a media content at the scene S, said request comprising data representative of acquisition conditions at the secondary acquisition unit 14.

Said data representative of acquisition conditions at the secondary acquisition unit 14, also referred to as "reference data", aim at describing the view from the device 1. In particular, the reference data consist in a parameter vector comprising the value(s) of at least one parameter chosen among environment parameters and/or positioning parameters, preferably both.

The environment parameters describe the exogenous acquisitions conditions, in particular define the light, the shadows (for pictures/videos), the wind (for audio), etc. They can be acquired by adequate sensors of the electronic device 1, or obtained from the network 20.

The positioning parameters describe the endogenous acquisitions conditions, i.e. how the secondary acquisition unit 14 is configured and placed within space, in particular define the attitude (i.e. orientation angles with respect to reference axes), the location, the distance with the scene S, the depth of field, etc. They can be obtained from adequate sensors of the electronic device 1 such as inertial sensors, GPS sensor, by triangulation, etc.

The present method may (but not necessarily) also comprise a step (a0) of acquiring a second media content using said secondary acquisition unit 14, the above-mentioned request being sent during or immediately following the acquisition of the second media content.

When such a second media content is acquired by the secondary acquisition unit 14, there may be an additional step (not illustrated) of extracting the environment and/or positioning parameters (as discussed previously) from this second media content, performed by the electronic device 1. Once extracted, these parameters may be then inserted in the request for acquiring media content to be sent to the server 2.

Alternatively, this second media content, or at least some part of it, can be sent directly to the server 2, within the request for acquiring a media content. The server 2 may then perform this extracting step the environment and/or positioning parameters.

The request for acquiring a media content at the scene may be sent automatically (for instance at each acquisition of a second media content) or manually (by the user), but advantageously this request is sent from the electronic device 1 when detecting (step (a1)) a given trigger event during the acquisition of said second media content.

This trigger may be of various type, including the reception of a notification from the server 2 indicating the possibility of enhancing the acquired media content, but in a preferred embodiment said trigger event is an action by the user on said interface 13 representative of an intent of improving quality of acquisition, notably a zooming in action on said interface 13. Indeed as explained the second media content (when it is a visual content such a picture or a video) is being displayed on the interface 13 during acquisition, and the user may wish to zoom in if he wish to see more closely the scene S.

The trigger threshold could be a pixel baseline: when the secondary acquisition unit 14 could not meet the baseline it triggers the sending of the request.

In a following step (b), in response to the request, the first media content is provided (typically by the processing unit 21 of the server 2), this first media content being generated from generic media content outputted by said at least one main acquisition unit C, as a function of data representative of acquisition conditions at the secondary acquisition unit 14.

As explained, the first media content constitutes an enhanced version of the second media content which is acquired by the secondary acquisition unit 14 (when this secondary acquisition unit 14 acquires such a media content), or which could be acquired by the secondary acquisition unit 14 (when this secondary acquisition unit 14 does not actually acquire such a media content), and thus it shall meet as much as possible the acquisition conditions at the secondary acquisition unit 14, i.e. similar environment and similar positioning, as defined of data representative of acquisition conditions at the secondary acquisition unit 14. In other words, the first media content shall simulate being acquired by the secondary acquisition unit 14, i.e. be a "virtual" second media content.

The generation of the first media content will be described more in details below.

In the case of acquisition of a second media content, the method may comprise a step (c) of combining the first and second media contents, so as to generate a composite media content.

Indeed, the first media content may lack of "local" details of the second media content (such as the seats, people, ambient noises, the face of the user if it is a selfie, etc.) which cannot be captured from the point of view of the main acquisition units C (which are generally closer to the scene S). A composite media content feels therefore more natural.

Such combination may be done using any technique known to the skilled person. For instance, the first and second media contents may be users as layers that can be superposed. Alternatively, only a video part (without sound) of the first media content and only the audio part of the second media content may be kept (or this opposite, for instance in the case of an event such as a concert or a conference), and they may be combined as a video content with sound.

This combination may be performed by the processing unit 11 of the electronic device 1, in which case the first media content (or only the part to be combined) is sent by the server 2 to the electronic device 1 for doing so. This embodiment is particularly suited for an electronic device 1 which has enhanced processing capacities in order to perform this combination, preferably in real time in order to be able to immediately render the result to the user.

Alternatively, this combination can be performed by the server 2, in which case the second media content (or only the part to be combined) may be sent by the electronic device 1 to the server 2 for doing so. This embodiment is particularly suited for an electronic device 1 with reduced processing capacities, since the electronic device 1 does not have to perform itself the combination.

Once the first media content (or the composite media content resulting from this first media content) is generated, it can be provided to electronic device(s) for rendering it to users.

In an embodiment, this is achieved by a further step (d) wherein the first media content (and/or the composite media content resulting from this first media content, when such a composite media content is obtained) is sent back to the electronic device 1, in order to be rendered by the electronic device 1. This way, the user of the device 1 at the stage can benefits, on device 1, of an enhanced media content when compared to what could be obtained using only the device 1.

In another embodiment, which can be combined with the previous one, there is a further step (e) of sharing the first media content (and/or the composite media content resulting from this first media content, when such a composite media content is obtained) with other device(s), typically not located at the scene S. In this case, the first media content (and/or the composite media content resulting from this first media content) is transmitted from the server 2 to one or more second electronic device(s) 3 (such as the terminal of a friend or a relative). Such a transmission to other device(s) 3 is then typically considered as being performed on behalf of the electronic device 1.

In this other embodiment, in the cases wherein step (c) is not performed (i.e. only the first media content is shared) or is performed at the server 2 (i.e. a composite media content is generated by the server 2 in order to be shared), the composite media content shared with the other device(s) 3 without overloading the network covering the stage where the electronic device 1 is located.

Still in this other embodiment, in the other case wherein step (c) is performed at the device 1 itself (i.e. a composite media content is generated by the electronic device 1 in order to be shared), step (e) may also comprise transmitting to the server 2 the composite media content from the device 1, in order for the server 2 to re-transmit this composite media content to one or more second electronic device(s) 3 as explained before.

This other embodiment avoids the need for emitting this media content from the electronic device 1 itself, when sharing it, allowing an important reduction of the bandwidth necessary at the vicinity of the scene S. Note that step (e) might be triggered after the transmission of a dedicated request from the device 1 to the server 2. Alternatively, step (e) could be simultaneously performed with step (b) or (c) if the user has for instance decided to live stream the media content.

Note that another trigger event could be detected at any point of the process, if for instance the user zooms out. Then, the generation and the transmission of the first media content would stop and the second media content would be used as such.

Generation of the First Media Content

In order to generate the first media content, the acquisition conditions at the secondary acquisition unit 14 have to be matched with the acquisition conditions at said acquisition units C. To this end, step (b) preferably comprises the selection of one or more main acquisition unit(s) C and/or the transformation of generic media content(s) outputted by such main acquisition unit(s) so as to cope with the acquisition conditions at the secondary acquisition unit 14.

Indeed, in the best case, there might be a main acquisition unit C whose point of view is substantially identical to that on the secondary acquisition unit 14 of the device 1. In such a case, this acquisition unit C is selected based on the data representative of acquisition conditions at the secondary acquisition unit 14, and the corresponding generic media content is simply selected as the first media content. Else, geometrical transformations have to be performed.

Generally speaking, when there is a set of main acquisition units C, step (b) advantageously comprises identifying a subset of said set of main acquisition units C as a function of data representative of acquisition conditions at the secondary acquisition unit 14, said first media content being generated from the generic media contents outputted by each of the main acquisition units C of said subset (i.e. are selected the unit(s) C of said subset).

Said identification is based on said data representative of acquisition conditions at the secondary acquisition unit 14: the main acquisition units C selected are those matching the acquisition conditions at the secondary acquisition unit 14, i.e. having acquisition conditions the more similar as possible to the acquisition conditions at the secondary acquisition unit 14. There may be for instance a comparison of the positioning parameters (location, attitude, etc.) received from the device 1, and the positioning parameters of each of the main acquisition units C. If the main acquisition units are fixed, their positioning parameters are predetermined, and if there are mounted on a rail or an arm their positioning parameters can be easily computed based on their movement.

If the difference in position or attitude is below a given threshold, a unit C can be selected. Alternatively, the n (for example 3) units C with the least difference of position or attitude could be selected. In a further embodiment, it might be decided that either a single unit C is selected (the one with the least difference of position or attitude among the ones with a difference in position or attitude is below a given threshold), or the whole set is selected (if no unit C has difference in position or attitude below the given threshold).

If only one unit C is selected (i.e. the subset only comprises this unit C), its generic media content can be used as such, or slightly transformed based on said positioning parameters.

If a plurality of units C is selected (i.e. the subset comprises more than one unit C), step (b) preferably comprises constructing a tridimensional model from the generic media contents outputted by the main acquisition units C, and generating said first media content from the tridimensional model. In the preferred embodiment wherein one or every main acquisition unit C is selected, it allows reconstructing the highest quality tridimensional model.

Then, from said tridimensional model is generated the first media content simulating being acquired from the secondary acquisition unit 14, in particular by projection of the tridimensional model according to positioning parameters transmitted to the server 2. The first media content thus corresponds to the view of the tridimensional model from the point of view of the secondary acquisition unit 14. Note that techniques of 3D reconstructions and projection are well known to the skilled person and will not be detailed here.

In any case, the generated first media content may comprise a post-processing before being sent to the device 1, as a function of environmental parameters received in the request: indeed, at this stage the first media content reliably simulates the geometrical conditions of acquisition (point of view, angle, etc.), but not necessarily the light, the exposure, etc. This post-processing aims at modifying the first media content so as to reproduce every acquisition condition at the secondary acquisition unit 14.

Note that step (b) may not be necessarily successful. For instance, if the user only records the audience and does not aim at all toward the scene S, the generic media contents outputted by the main acquisition units C would not be usable, as none of the main acquisition units C would present acquisition conditions matching that of the secondary acquisition unit (14). Furthermore, the constructed tridimensional model has generally a volume limited to that of the scene S.

If none of the main acquisition units C could be selected or if projection from a constructed tridimensional model id impossible, no first media content is generated and the device 1 may be informed to use the second media content (as this one cannot be enhanced at the moment). Naturally, should the user starts acquiring a video of the scene, the generation of a first media content would then become possible.

To sum up, once the trigger event has been detected at step (a1), the generation of the first media content is preferably dynamic, i.e. performed every time it is possible, else the device 1 falls back on the second media content.

Server and Computer Program

In a first aspect, the present development relates to a server 2 comprising a processing unit 21, possibly a memory 22, and connected to at least one main acquisition unit C, adapted for carrying out the for assisting the acquisition of a media content at a scene S as previously described.

Said processing unit 21 is configured to implement:

Receiving, from an electronic device 1 comprising a secondary acquisition unit 14, a request for acquiring a media content at the scene S, said request comprising data representative of acquisition conditions at the secondary acquisition unit 14;

Providing in response a first media content generated 14 from generic media content outputted by said at least one main acquisition unit C, as a function of data representative of acquisition conditions at the secondary acquisition unit.

Said electronic device 1 preferably comprises secondary acquisition unit 14, and interface 13 and a processing unit 11 configured acquire a second media content using said secondary acquisition unit 14, and to send said request for acquiring a media content at the scene S when detecting a given trigger event (an action by the user on said interface 13 representative of an intent of improving quality of acquisition, such as a zooming in action) during the acquisition of said second media content.

The development further proposes a computer program product, comprising code instructions for executing (in particular with a processing unit 21 of the server 2) a method according to the method for assisting the acquisition of a media content at a scene S; and a computer-readable medium (in particular a memory 22 of the server 2), on which is stored a computer program product comprising code instructions for executing said method.

The invention claimed is:

1. A method for assisting acquisition of a media content at a scene provided with a set of main acquisition units connected to a server, the method comprising:
   receiving, from an electronic device comprising a secondary acquisition unit, a request for acquiring a media content at the scene, the request comprising data representative of acquisition conditions at the secondary acquisition unit; and
   providing in response a first media content generated from generic media content acquired by a subset of the set of main acquisition units, as a function of data representative of acquisition conditions at the secondary acquisition unit,
   wherein providing in response the first media content comprises identifying the subset of the set of main acquisition units as a function of data representative of acquisition conditions at the secondary acquisition unit, the first media content being generated from the generic media contents outputted by each of the main acquisition units of the subset.

2. The method according to claim 1, further comprising acquiring a second media content using the secondary acquisition unit.

3. The method according to claim 2, further comprising a combining the first and second media contents, so as to generate a composite media content.

4. The method according to claim 2, wherein the request for acquiring a media content at the scene is sent from the electronic device when detecting a given trigger event during the acquisition of the second media content.

5. The method according to claim 4, wherein the electronic device also comprises an interface, the trigger event being an action by a user on the interface representative of an intent of improving quality of acquisition.

6. The method according to claim 5, wherein the media content is a visual content, the second media content being displayed on the interface during acquisition, wherein the trigger event is a zooming in action on the interface.

7. The method according to claim 1, wherein providing in response the first media content comprises constructing a tridimensional model from the generic media contents outputted by the main acquisition units, and generating the first media content from the tridimensional model.

8. The method according to claim 1, wherein the data representative of acquisition conditions at the secondary acquisition unit comprises a value of at least one parameter chosen among environment parameters and/or positioning parameters.

9. The method according to claim 1, further comprising transmitting to the electronic device the first media content or composite media content from the server.

10. The method according to claim 1, further comprising transmitting to at least one second electronic device the first media content, or composite media content from the server.

11. A server connected to a set of at least one main acquisition units of a scene, the server comprising a processing unit configured to implement:
    receiving, from an electronic device comprising a secondary acquisition unit, a request for acquiring a media content at the scene, the request comprising data representative of acquisition conditions at the secondary acquisition unit; and
    providing in response a first media content generated from generic media contents acquired by a subset of the set of main acquisition units, as a function of data representative of acquisition conditions at the secondary acquisition unit,
    wherein providing in response the first media content comprises identifying the subset of the set of main acquisition units as a function of data representative of acquisition conditions at the secondary acquisition unit, the first media content being generated from the generic media contents outputted by each of the main acquisition units of the subset.

12. A processing circuit comprising a processor and a non-transitory memory, the non-transitory memory storing code instructions of a computer program comprising code instructions for executing the method according to claim 1, when the program is executed by the processor for assisting the acquisition of a media content at a scene.

13. A non-transitory computer-readable medium, storing instructions of a computer program causing executing the method according to claim 1, when the program is executed by a processor for assisting the acquisition of a media content at a scene.

* * * * *